(12) United States Patent
Esmiller

(10) Patent No.: US 6,937,329 B2
(45) Date of Patent: Aug. 30, 2005

(54) METHOD FOR DETECTING AND IDENTIFYING DEFECTS IN A LASER BEAM WELD SEAM

(75) Inventor: Bruno Esmiller, Nanterre (FR)

(73) Assignee: Aerospatiale Matra CCR, Paris (FR)

( * ) Notice: Subject to any disclaimer, the term of this patent is extended or adjusted under 35 U.S.C. 154(b) by 53 days.

(21) Appl. No.: 10/312,686

(22) PCT Filed: Jul. 5, 2001

(86) PCT No.: PCT/FR01/02157

§ 371 (c)(1),
(2), (4) Date: Dec. 30, 2002

(87) PCT Pub. No.: WO02/02268

PCT Pub. Date: Jan. 10, 2002

(65) Prior Publication Data

US 2004/0032597 A1 Feb. 19, 2004

(30) Foreign Application Priority Data

Jul. 6, 2000 (FR) .......................................... 00 08798

(51) Int. Cl.[7] .......................... G01N 21/00; B23K 26/00
(52) U.S. Cl. ............................... 356/237.2; 219/121.63
(58) Field of Search .......................... 356/237.1–237.2, 356/376, 390; 219/121.62, 121.63, 121.64, 121.83; 364/474.08; 250/205, 221

(56) References Cited

U.S. PATENT DOCUMENTS

| | | | | |
|---|---|---|---|---|
| 3,712,736 A | * | 1/1973 | Boncoeur et al. ........... 356/300 |
| 5,245,409 A | * | 9/1993 | Tobar .......................... 356/606 |
| 5,272,312 A | | 12/1993 | Jurca |
| 5,329,091 A | | 7/1994 | Bissinger |
| 5,486,677 A | | 1/1996 | Maischner et al. |
| 5,651,903 A | | 7/1997 | Shirk |
| 5,841,098 A | | 11/1998 | Gedrat et al. |
| 5,961,859 A | * | 10/1999 | Chou et al. ............ 219/121.63 |
| 5,969,335 A | * | 10/1999 | Karasaki ...................... 250/205 |
| 5,978,090 A | * | 11/1999 | Burri et al. .................. 356/613 |

FOREIGN PATENT DOCUMENTS

| | | |
|---|---|---|
| EP | 0 911 109 A2 | 4/1999 |
| EP | 0 911 109 A3 | 3/2000 |
| WO | WO 00/41837 | 7/2000 |

OTHER PUBLICATIONS

S. Palanco "Spectroscopic Monitoring During Laser Welding of Aluminum Alloys for Weld Defects Diagnotics" 2003, Department of Analytical Chemistry Faculty of Sciences, University of Malaga.*

Kwon, Jangwoo "Development of Neural network based Plasma Monitoring System for Laser Welding Quality Analysis" 1999 IEEE TENCON.*

* cited by examiner

Primary Examiner—Michael P. Stafira
(74) Attorney, Agent, or Firm—Pearne & Gordon LLP

(57) ABSTRACT

A method for detection and identification of defects in a weld seam created using a laser beam.

According to this method, at least two measurement signals are acquired in real time delivered by optical sensors (C1 to C6) detecting variations in luminous intensity of the plasma formed by the laser beam (14). These signals are then combined by applying a mathematical operation. The combined signal obtained is then compared to a predetermined threshold. Depending on the result of this comparison, a determination is made of the presence or absence of a defect corresponding to the operator used.

55 Claims, 4 Drawing Sheets

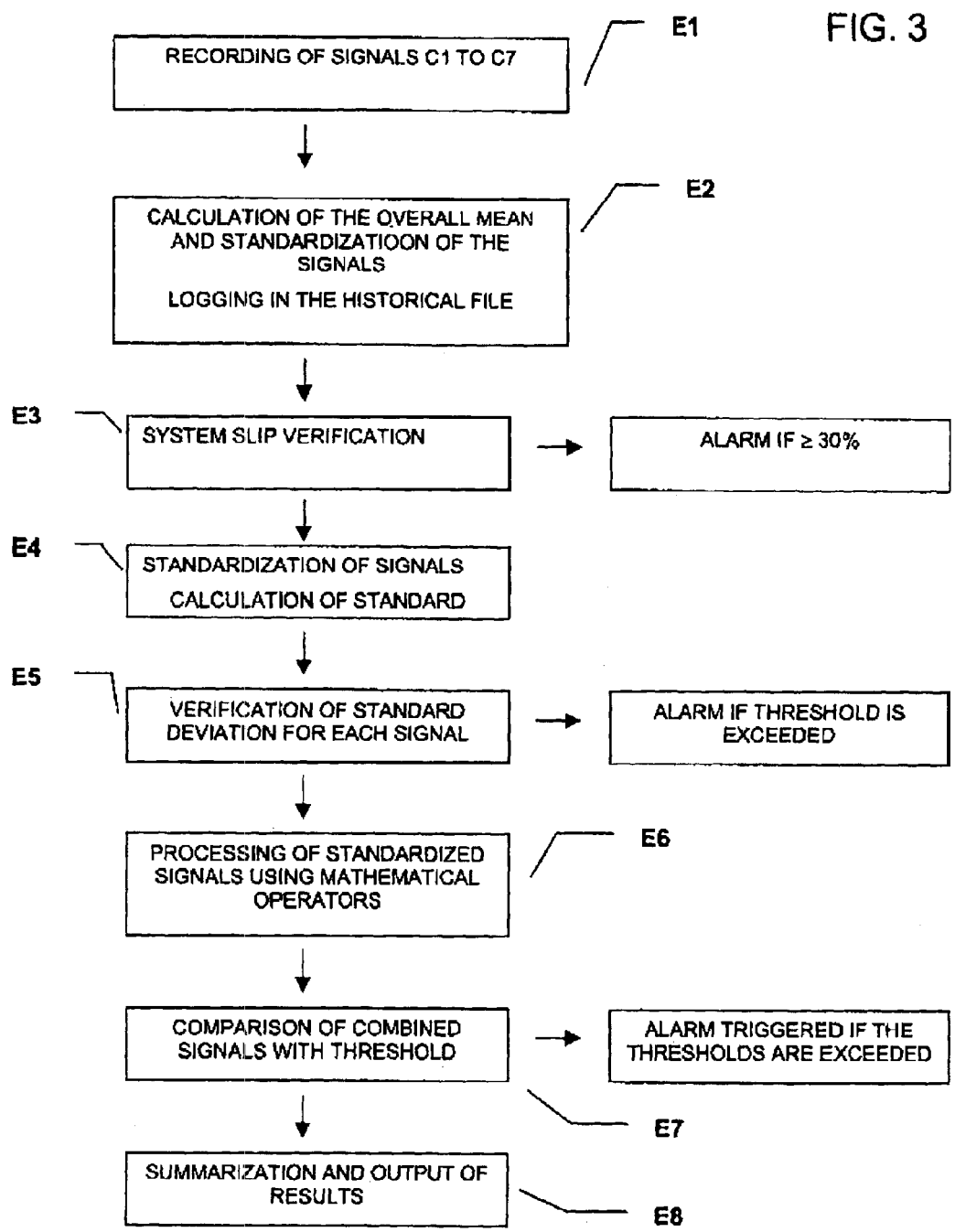

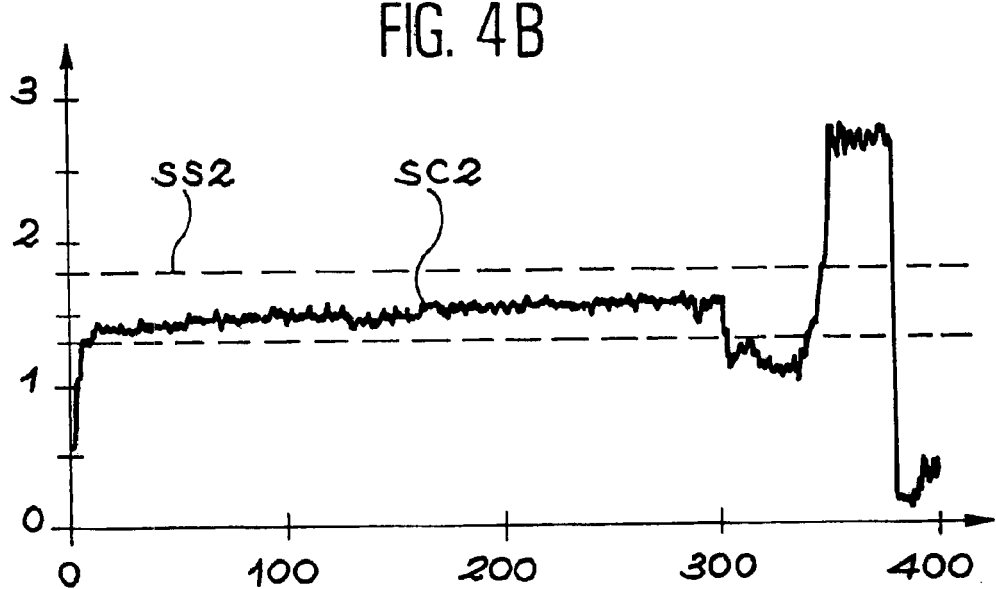
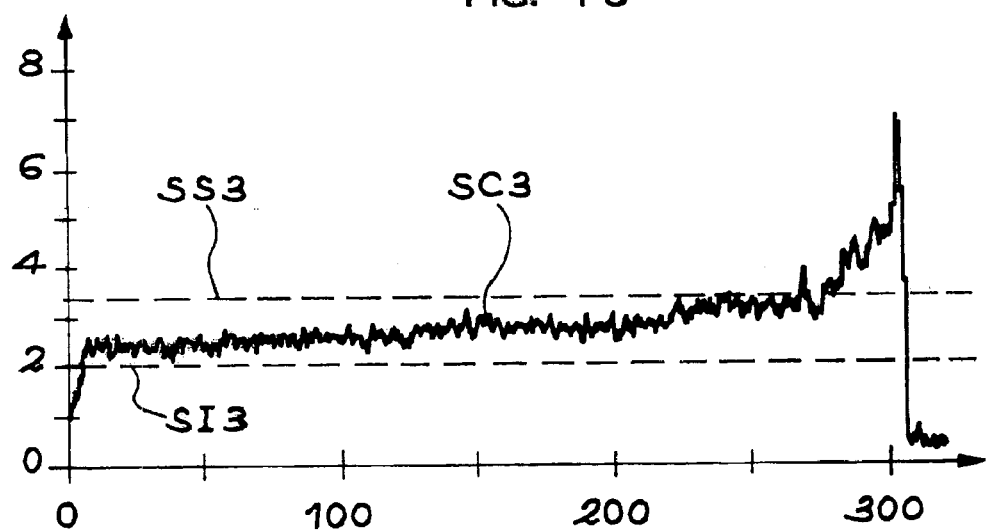

METHOD FOR DETECTING AND IDENTIFYING DEFECTS IN A LASER BEAM WELD SEAM

TECHNICAL FIELD

The invention relates to a procedure developed for non-destructively detecting, localizing and identifying in real time any defects present in weld seams made by one or a plurality of laser beams.

More particularly, the invention relates to a method for detecting and identifying defects, which makes use of optical sensors sensitive to variations in luminous intensity of the plasma that forms in the region of the weld under the effects of the laser beam(s).

The invention is applicable to welding of parts of any type of metal such as parts made of aluminum alloy, titanium alloy, inox steel, etc. In particular, it can be utilized to inspect edge-to-edge welding of two metal sheets, welding of a stud on a metal sheet (T-joint, double filet weld), etc.

Further, the invention can be adapted to different welding configurations. Thus, it related to all types of welding using one or a plurality of lasers, YAG, $CO_2$, etc. with or without filler material.

The defects that can be detected and identified using the method according to the invention are internal or external defects considered hazardous to the weld seam. The absence of interpenetration of the weld line in the case of T-joints or double filet joints, filler wire problems, presence of holes or bubbles, the existence of geometric defects, etc. can be cited by way of non-limiting example.

State of the Art

In the aeronautical industry, assembly of different pieces such as the sheet metal forming the exterior hull (fuselage, wing system, etc.) of an aircraft as well as the internal T-joints, is usually done using rivets. The replacement of conventional riveted assemblies with welded assemblies represents a noteworthy advance, in particular in terms of mass, aerodynamics and manufacturing time.

In order not to deform the covering sheet metal in the case of a stud sheeting, replacement of riveted assemblies with welded assemblies requires the utilization of laser welding. In fact, this technique allows increased work speed without incurring noteworthy deformations.

In the hypothesis wherein the laser welding method would be used instead of conventional rivet assembly, efficient and reliable means should be available for inspecting the weld seams and identifying any defects detected in order to be able to quickly correct them. The inspection means must be non-destructive and allow, insofar as possible, real time acquisition of the data enabling inspection; that is, directly at the time of passage of the welding head.

There are inspection systems or weld monitoring systems realized by one or a plurality of lasers, which use optical sensors for measuring the temperature of the weld seam. The monitoring system commercialized under the name JURCA "LWM 900" comprises the two types of sensors. The monitoring system commercialized under the PROMOTEC "Welding Monitor FP 1000" comprises only sensors sensitive to variation in luminosity of the plasma.

The majority of these existing welding monitoring systems find applications in the automotive industry and are intended for inspecting weld seams done between pieces of steel. The means for processing the signals delivered by the sensors are conceived essentially as a function of the response of the sensors to that material. They are totally inappropriate for materials of other types and particularly for alloys of titanium or aluminum used in other industries such as the aeronautical industry. Furthermore, the means for processing the signals used in these known welding monitoring systems do not have the precision and reliability required in the context of the latter industry.

Otherwise the welding monitoring systems used today in the automotive industry use unwieldy sensors, placed in the immediate proximity of the welding head. Such operations limit the number of sensors and consequently, the number of measurement signals available to assure the detection of defects.

Among the existing welding monitoring systems, one can also cite the systems described in the documents U.S. Pat. No. 5,329,091, U.S. Pat. No. 5,651,903 and U.S. Pat. No. 5,272,312.

According to U.S. Pat. No. 5,329,091, the ultraviolet radiation of the plasma produced by the laser beam is detected by a sensor placed near the welding point and equipped with an appropriate filter. The analog signal supplied by the sensor is compared to a threshold and given a value of 1 or 0, depending on whether it is higher or lower than said threshold. Then the periods are selected, wherein the signal is equal to 0 over their durations. This system enables detecting certain defects. However, it does not enable identification with certainty or entirely.

According to U.S. Pat. No. 5,651,903, a first optical sensor monitors the variations in the ultraviolet emissions of the plasma and a second optical sensor measures the variations in temperature of the weld seam downstream of the welding region. Then, the zones in which the variations in signals sent by the two sensors are maximal are determined and, when the zones are substantially the same, the signals are compared to signals characteristic of certain defects in order to emit a fault signal when a defect is detected. As in the above case, this system cannot detect, much less distinguish in a reliable manner all of the possible defects present in the welding seam.

According to U.S. Pat. No. 5,272,312, two optical sensors are used oriented towards the plasma formed by the laser beam and respectively monitor the ultraviolet and infrared radiation. Any defects are detected by individually processing the signal supplied by each of the sensors. Discrimination between the different types of defects is not reliably assured.

Disclosure of the Invention

The object of the invention is a method enabling real-time, reliable and reproducible detection and identification of possible defects present in laser weld seams.

According to the invention, this result is obtained by means of a method for detecting and identifying defects at the time the welding seam is realized using at least one laser beam forming a plasma in a welding region, using which at least two measurement signals are supplied in real time by separate optical sensors that detect variations in luminosity of the plasma, characterized in that the measurement signals are combined by applying to them at least one mathematical operator suitable for detection of a corresponding defect; in order to obtain at least one combined signal, each combined signal is compared to a predefined threshold and the presence or absence of the defect is diagnosed corresponding to each mathematical operator using the result of the comparison.

The applicant has established that the combination of signals assured by the application of certain particularly simple mathematical operators enables the different defects to be distinguished from each other at will.

In one preferred embodiment of the invention, the mathematical operator is chosen from the group comprising addition, subtraction, multiplication, division and a combination of these operations.

A first application of the invention relates to soldering of a T-joint on a plate using two laser beams placed on one side and on the other of the joint.

In this application, two groups of at least one optical sensor or two groups of at least two optical sensors that detect variations in the luminous intensity of the plasma in the different optical bands; disposed on either side of the joint, the optical sensors of the two groups are identical.

When two groups of at least one sensor is used, preferably the measurement signals supplied by one sensor of each group are added and the presence of a separation or weld interpenetration fault due to the lack of laser beam power when the result is lower than a first predefined threshold.

When two groups of at least two sensors are used, advantageously firstly the measurement signals supplied by a first pair of identical sensors are added and then the measurement signals supplied by a second pair of identical sensors are added, the one of the two sums obtained is multiplied by the other sum and a weld seam interpenetration defect is determined due to a defect other than the inadequacy of laser beam power, when the result is greater than the second predefined threshold.

Generally, the joint and the plate are positioned in advance relative to each other by welding points. Preferably, two groups of at least one sensor are then used, one of the measurement signals supplied by two identical sensors is divided by the other and the presence of defective previously positioned welding points are detected, when the result is greater than a third predefined threshold.

When two groups of at least two sensors are used, advantageously firstly the measurement signals supplied by a first pair of identical sensors are added and then the measurement signals supplied by a second pair of identical sensors are added, the one sum obtained is divided by the other and an inadequate width of the welding seam is detected, when the results of the division is less than a fourth predefined threshold.

Another application of the invention relates to edge-to-edge welding of two plates using a laser beam.

In this case, at least two optical sensors are advantageously used that detect variations of luminous intensity of the plasma in the different optical bands, the one of the measurement signals supplied by the two sensors is divided by the other and an inadequate thickness of the welding seam is detected when the result is greater than a second threshold, greater than the first.

In the preferred embodiment of the invention, the measurement signals are acquired by means of at least one group of three sensors, the sensors of each group detecting variations of luminous intensity of the plasma in a principally ultraviolet frequency band, a principally visible frequency band, and a principally infrared frequency band, respectively.

According to another aspect of the invention, optical sensors, so-called "plasma sensors", are used each one comprising one fiberoptic, whose first end is placed in the vicinity of the welding region and an optical filter being placed in the extension of the second end of the fiberoptic and a photodiode placed on the face of the second end of the fiberoptic, on the other side of the filter.

In this case, the first end of the fiberoptic is placed preferably at approximately 10 cm from the welding region.

Advantageously, a supplementary measurement signal is acquired by means of another optical sensor called the "thermal sensor", which detects the variations in thermal energy of the welding seam upstream of the welding region.

In this case, the thermal sensor comprises another fiberoptic, whose first end is placed downstream of the welding region and oriented towards the weld seam and a photodiode sensitive to thermal radiation is placed in the extension of the second end of the other fiberoptic. Otherwise, an optical focussing means such as lens is place at the first end of said fiberoptic. The first end of said fiberoptic is thus placed preferably at a distance between approximately 10 cm and 20 cm from the welding zone. The measurement zone having a diameter of between 1 and 3 mm is preferably disposed between 5 mm and 5 cm behind the welding zone depending on the material being welded.

In the preferred embodiment of the invention, the measurement signals are combined and are compared to said predefined thresholds after said signals have been acquired in real time for the welding seam being considered.

In this case, advantageously the mean value, the standardized mean value, then the standard deviation of each measurement signal, is calculated and a qualitative irregularity of the weld seam is diagnosed, when the standard deviation exceeds a predefined value.

Thus, one can then compare the mean value of each measurement to the previous mean values of said signal recorded for a given number of welding seams previously inspected and diagnoses a derivative from the measurement apparatus when the average value of the signal varies by at least about 30% relative to the preceding mean values.

BRIEF DESCRIPTION OF THE DRAWINGS

A non-limiting exemplary preferred embodiment of the invention will now be described with reference to the annexed drawings, wherein

FIGS. 4A to 4C are the curves that represent, in three particular applications, the comparison of the combined measurement signals compared to predefined threshold values according to the invention.

DETAILED DISCLOSURE OF A PREFERRED EMBODIMENT OF THE INVENTION

Figure 1:
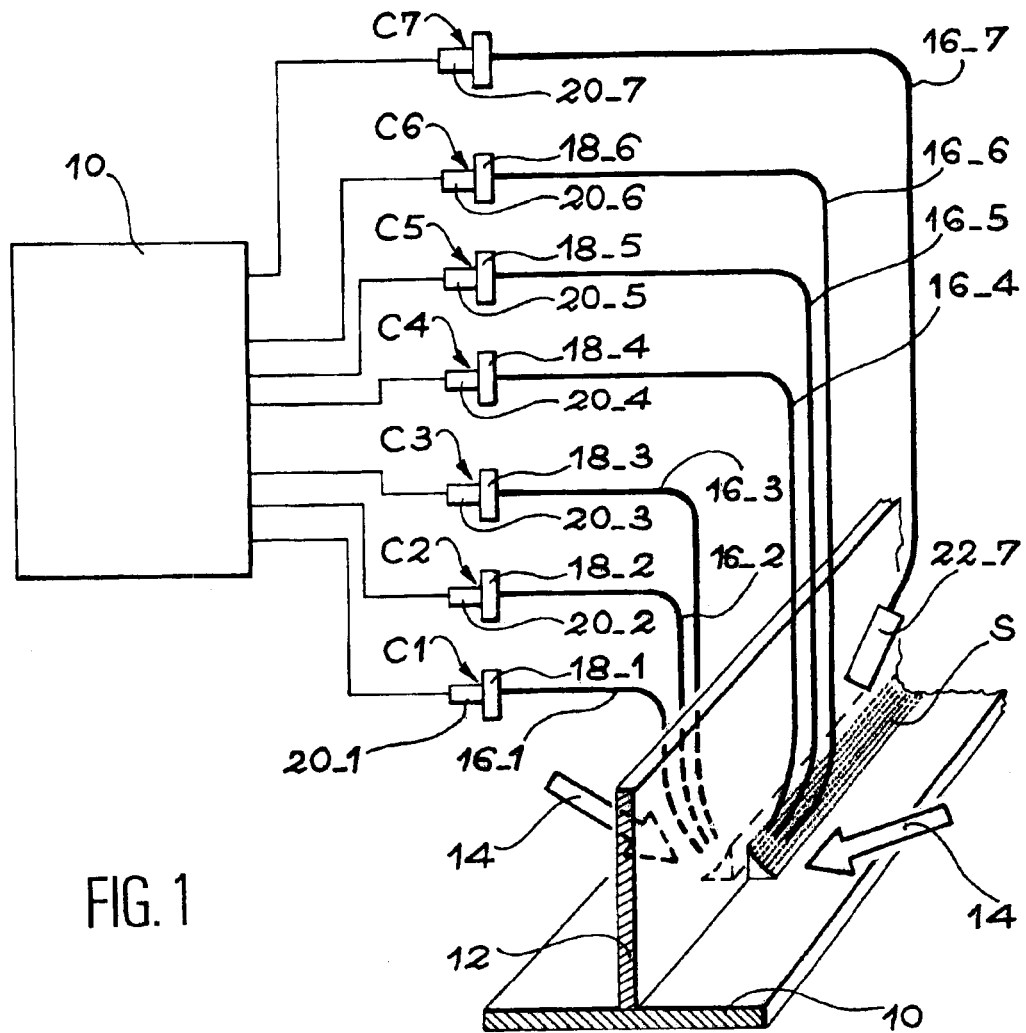
FIG. 1 is a perspective view schematically representing a laser welding apparatus used for soldering a T-joint onto a plate and equipped with a defect detection and identification system implementing the method according to the invention.

As represented schematically in FIG. 1, the invention relates to the real-time, non-destructive inspection of the quality of a welding realized between two pieces 10 and 12 using one or a plurality of lasers 14 (represented by the arrows in FIG. 1.). As illustrated by way of non-limiting example, the piece 10 can be a substantially flat or slightly curved metal plate and the piece 12 can be a stud that is to be welded onto the inside face of the metal plate 10 by means of two laser beams 14 disposed on either side of the stud 12. The invention, however, also relates to other types of assemblies such as edge-to-edge assembly of two metal plates, etc.

In other respects, the pieces 10 and 12, whose welding is to be inspected, are metallic pieces what can be made of different metals such as alloys of aluminum, alloys of titanium, inox steels, etc.

The laser(s) 14 used for welding together the pieces 10 and 12 can be comprised of any type of laser conventionally used in the industry for welding the concerned materials.

According to one common method, called point or tack welding, the pieces 10 and 12 that are to be assembled by welding are generally positioned in advance relative to each other by welding points (not shown).

Welding of pieces 10 and 12 is done by a welding machine (not shown) that includes a welding head disposed in proximity to the pieces 10 and 12 to be welded and means for assuring relative displacement between said welding head and the pieces along a predefined welding line. These different elements are well-known to the specialist in the art and are not part of this invention. For a better understanding, it is simply recalled here that the welding head integrates in particular optical systems allowing directing the laser beam (s) onto the welding region; a filler metal feeder device for the filler metal required for welding and one or a plurality of jets, through which a neutral gas such as argon or helium is sent to the welding zone.

According to the invention, a control or monitoring system is incorporated in the welding machine and enables detecting, localizing and identifying in real-time; that is at the time of passage of the welding head, any defects in the weld made.

In the preferred embodiment of the invention illustrated schematically in FIG. 1, the inspection system comprises sever optical sensors, C1 to C7, as well as the means 10 for acquiring and treatment of measurement signals provided by each of these captors. In other applications, the number optical sensors used can, however, be different from seven and can comprised any number greater than or equal to seven and comprised on any number greater than or equal to two without departing from the context of the invention.

The C1 to C6 sensors are so-called plasma sensors that detect the variations in luminous intensity of the plasma formed by the laser beams 14 in the welding region. To do this, each of the C1 to C6 sensors is mounted on the welding head and oriented towards the point of impact of the laser beam on the pieces 10 and 12.

Each of the C1 to C6 plasma sensors comprises a fiberoptic 16-1 to 16-6, respectively, whose first end is situated in proximity to the welding region and oriented towards said region; that is, towards the point of impact of the laser beam 14 on the pieces 10 and 12. More precisely, the fiberoptics 16-1 to 16-3 are arranged alongside the stiffener 12 and oriented towards the plasma formed by the laser beam 14 directed towards that same side, whilst the fiberoptics 16-4 to 16-6 are disposed on the other side of the stiffener 12 and oriented towards the plasma formed by the laser beam 14 directed towards said other side. In order to avoid projections of molten metal as well as the high heat released at the time of welding, the first end of each of the fiberoptics 16-1 to 16-6 is disposed approximately 10 cm from the welding region.

The optical fibers 16-1 to 16-6 are, for example, step-index PMMA fibers. This type of fiber has the particular advantage of having a significant numerical aperture allowing the entirety of the plasma to be observed as well as good transmission of the observed wavelengths.

Each of the C1 to C6 sensors comprises in addition a respective optical filter 18-1 to 18-6 arranged in the extension of the opposite end of the corresponding fiberoptic. More particularly, the fiberoptics 18-1 and 18-4 and the sensors C1 and C4 allow passage mainly of a band of frequencies corresponding to the ultraviolet radiation, the filters 18-2 and 18-5 of the sensors C2 and C5 allow passage mainly of a band of frequencies corresponding to visible radiation, and the filters 183 and 18-6 allow passage mainly of a band of frequencies corresponding to infrared radiation.

Each of the C1 to C6 sensors comprises, in addition, respectively a photodiode 20-1 to 20-6 disposed facing the second end of the corresponding fiberoptic on the other side of the filter. The photodiodes transform the optical signals that they receive into electrical signals. These latter signals comprise the measurement signals supplied by the captors C1 to C6. The photodiodes 20-1 to 20-6 are, for example, silicon photodiodes sensitive in the range of 0.3 to 1.1 $\mu$m.

In the configuration just described, utilization of fiberoptics 16-1 to 16-6 allows disposing of an increased number sensors, while reducing to a maximum the space requirement of the inspection system in the vicinity of the welding region. In fact, the relatively voluminous elements such as the filters and the photodiodes can be installed outside of said zone.

This configuration also enables acquiring measurement signals representing a large number of different magnitudes (six in the example described), which contributed to increasing the information enabling detection of possible defects and to distinguish them from each other.

The seventh optical sensor C7, being optional, is a thermal sensor that detects the variations in the thermal energy of the welding seam behind the welding zone; that is, behind the point of impact of the laser beam 14 on the pieces 10 and 12.

Figure 2:
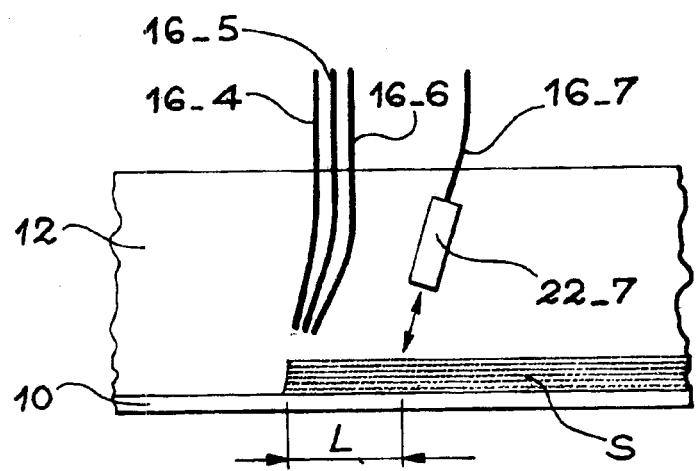
FIG. 2 is a side view schematically representing the position of the thermal sensor relative to that of the plasma sensors.

In more precise fashion and as represented in particular in FIG. 2, the thermal sensor C7 also comprises an optical filter 16-7. A first end f this fiberoptic 16-7 is oriented towards the welding seam S formed behind the welding region on one side of the stiffener 12. More precisely, the first end of the fiberoptic 16-7 is oriented towards a point of the welding seam S situated at a distance L, between 5 mm and 1 cm, behind the welding region. In fact, the other positions of the measuring point do not allow obtaining usable signals.

The end of the fiberoptic 16-7 turned facing the welding seam S is equipped with a focussing means 22-7 such as a 20 mm focal lens enabling limiting the observation zone of the C7 sensor to a circle of approximately 1 to 3 mm in diameter and placing the end of the fiber equipped with its focussing system approximately between 10 and 20 cm from the welding zone.

The fiberoptic 16-7 is a silicon fiber having low attenuation in the near infrared (between 1 and 1.8 $\mu$m). A photodiode 20-7 is disposed facing the end opposite to the fiberoptic 16-7. This photodiode 20-7 transforms the optical signals routed by the fiberoptic 16-7 into electrical signals that also comprise measurement signals according to the invention. The spectral response of the photodiode 20-7 varies, for example, between 0.8 and 1.8 $\mu$m. In this case, an optical filter 18-7 is also interposed between the optical fiber 16-7 and the photodiode 20-7 in order to block the radiation wavelength lower than 1 $\mu$m so that the sensor C7 does not pick up the light emitted by the plasma.

An electronic bandpass filter (not shown) is arranged at the output of each of the photodiodes 20-1 to 20-7 in order to suppress any parasites in the processed signals.

The measurement signals supplied by each of the sensors C1 to C7 are transmitted to the acquisition and processing means 10. These means, which in particular include a computer, can be installed anywhere, whether in the proximity of the welding head or not.

As represented schematically in FIG. 3, the signal acquisition and processing means 10 for the measurement signals perform a certain number of operations in succession, which will now be described in detail.

When a first step E1, which is effected simultaneously with the realization of the welding seam S by the laser beam 14, the seven measurement signals supplied by the sensors C1 to C7 are registered.

Figure 3:
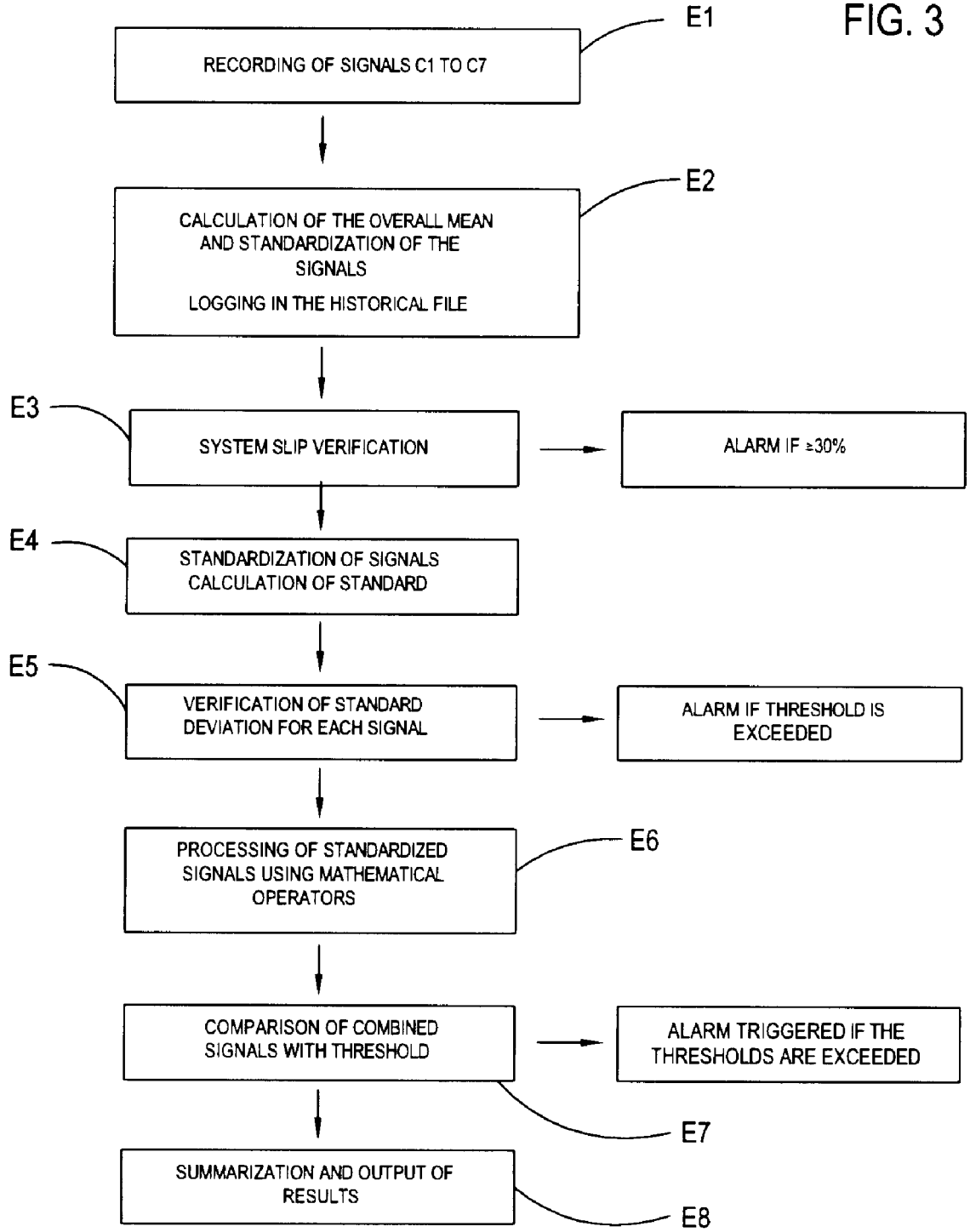
FIG. 3 is a flow chart explaining the different processing steps of the measurement signals in the defect detection and identification system of FIG. 1.

A second step, shown as E2 in FIG. 3, is effected when the welding seams S are finished. In this step, for each of the measurement signals, the overall mean value of this signal over the entire duration of measurement is calculated corresponding to the realization of the welding seam S being considered. Then the standardized mean of each measurement signal by bringing this signal to the unity. Thus, particularly problems deriving offsets in the measurements owing to the differences in relative positioning of the sensors. The overall mean value and the standardized mean value of each of the signals are recorded in a file, in which the history is saved in memory of all of the inspections performed.

With the step E3, verification is made that there are no unacceptable slips in the inspection system. For this purpose, the overall mean of each of the measurement signals that has been calculated is compare to the overall means of these signals recorded at a certain number of corresponding measurements made previously. By way of example, the five last-recorded values are compared. When this comparison reveals a deviation in excess of a predefined threshold (for example, 30%), the operator is alerted by release of an alarm. This alarm can be of any kind (visual, acoustic, etc.).

At the time of the following step, identified by reference E4 in FIG. 3, each of the seven measurement signals is standardized. This operation is don by dividing the instantaneous value of each signal by the mean value of this signal calculated in step E2. Then the standard deviation is calculated for each of the measurement signals using the standardized signals.

With the following step E5, verification is made that the value of the standard deviation of each measurement signal that has been calculated does not exceed a predefined threshold proper to this signal. If the predefined threshold is exceeded, the operator is alerted by release of an alarm. This alarm can be of any kind (visual, acoustic, etc.). In fact, exceeding this threshold reveals a welding quality that varies excessively over its entire length.

The program passes then to a step E6, essentially according to the invention, in the course of which the different standardized measurement signals are processed in such a fashion as to detect, localize and identify the different defects possible present in the welding that has just been carried out.

In the course of this step E6, at least one simple mathematical operator is applied to one group or a plurality of groups of at least two standardized measurement signals in such a fashion as to obtain one signal or a plurality of combined signals. Each operator and the group of signals to which it is applied are integral t the detection of a particular type of defect, as illustrated in the examples that will be described in the following.

Each combined signal obtained by the application of a particular operator is then compared in E7 to a predefined threshold, which depends also on the operator and, consequently, on the type of defect to be detected. When the combined signal reaches this threshold (that is, when it becomes greater than this threshold, when it corresponds to a maximal value or when it becomes less than this threshold, when it corresponds to a minimal value), the operator is informed of the occurrence of an anomaly, of a detection of a defect and of its nature. This information can be assured by any means such as a visual, acoustic or other type of alarm, display, etc.

The results obtained by the application of these different processes are finally edited in the form of a summary report as indicated in E8 in FIG. 3. The summary report indicates in particular if the welding is acceptable or not, if certain controls must be changed on the welding machine, etc.

In the particular case, illustrated in FIGS. 1 and 2, of a welding of a stiffener 12 on a metal plate 10 different processes capable of being carried out in step E7 will now be described by way of example, when using the seven sensors C1 to C7.

Using a first treatment, the standardized measurement signals derived from the sensors C1 and C4 or C2 and C5 are added. The operator is then simple addition. Then the combined signal obtained is compared to a predefined threshold. If the previously calculated sum is less than the threshold over part of the length of the welding seam S, this means that in this zone there is an inadequate interpenetration of at of these welding seams and that this defect is caused by insufficient laser beam power. This information is then brought to the attention of the operator in some appropriate form.

Figure 4A:
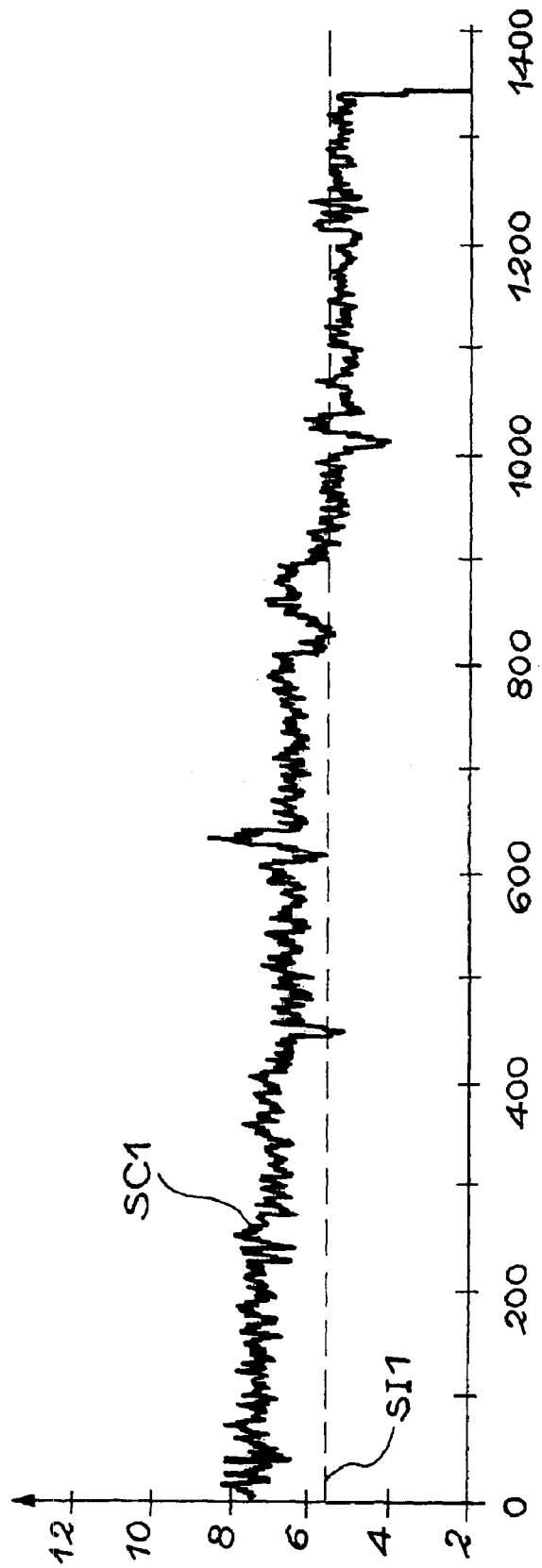

FIG. 4A is a plotting obtained at the time of a trial by applying this first treatment on the base of the standardized measurement signals supplied by sensors C1 and C4. In this plotting the abscissa shows the distance (in mm) traveled along the welding seam and on the ordinate the combined signal SC1 corresponding to the sum of the standardized measurement signals supplied by the sensors C1 and C4. It can be seen that this combined signal SC1 is lower than the lower threshold SI1 in the part of the welding seams situated between 900 mm and 1350 mm. It is deduced from this that the interpenetration of the seams is insufficient in this zone by reason of insufficient laser beam power.

According to a second process, a mathematical operator that adds on the one hand the signals supplied by the sensors C1 and C4 and on the other hand the signals supplied by the sensors C2 and C5 is applied to the standardized measurement signals supplied by the sensors C1, C2, C4 and C5; then the one sum is multiplied by the other sum. The combined signal obtained by applying this operator is then compared to a second predefined threshold. If this threshold is exceeded, it is deduced therefrom that there is inadequate interpenetration of the two welding seams S due to a problem other than insufficient laser beam power. This other problem can be, for example, insufficient filler metal. As in the previous case, the corresponding information is brought to the attention of the user.

According to a third process, an operator consisting of division is applied to the standardized measurement signals supplied by the sensors C1 and C4. In other words, the standardized measurement signal issued from the sensor C1 is divided by the standardized measurement signal issued by the sensor C4. The combined signal thus obtained is then compared to a third greater threshold. If the comparison reveals that the combined signal exceed this third threshold, it is deduced therefrom that the tacking or pointing of the pieces is deficient. The corresponding information is brought to the attention of the user in any appropriate form.

Finally, according to a fourth process, on the one hand the sum of the standardized measurement signal supplied by the sensors C1 and C4 and on the other hand the sum of the standardized measurement signals from the sensors C2 and C5 is calculated. Then the first of these sums is divided by the second, after which the combined signal thus obtained is compared to a fourth lower threshold. When this comparison reveals that the combined signal thus calculated is less than this fourth threshold, it is deduced therefrom that the welding seams S are too narrow. The corresponding information is brought to the attention of the user in any appropriate form.

The same defect can be detected by applying an operator comparable to the aforesaid operator, in which the two sums are replaced by two multiplications. Then the combined signal thus obtained is then compared, by dividing the one by the other of the results of these two multiplications, to a predefined lower threshold.

As has already been indicated, the invention also relates to other welding types. Thus, it can also be used in the case of edge-to-edge welding of two metal plates by a single laser beam.

In this case, for example at least two plasma sensors are used that detect the variations in luminous intensity of the plasma in different optical bands. The standardized measurement signals supplied by these sensors can then be divided by each other to produce a combined signal, which is then compared to a predefined lower threshold and/or to a predefined higher threshold.

When the combined signal is less than the lower threshold, it is deduced therefrom that the welding seam has a hollow part in the concerned zone. When, in contrast, the combined signal is greater than the higher threshold, it is deduced therefrom that the welding seam is incomplete.

FIGS. 4B and 4C represent the results of trials conducted with edge-to-edge welding of two inox steel plates and with edge-to-edge welding of two titanium alloy plates. In the two cases, welding was realized using a $CO_2$ laser. As shown in FIG. 4A, the distance (in mm) along the welding seam is on the abscissa and the value of the corresponding signal relation corresponding to the combined signal is on the ordinate.

In the case of FIG. 4B, the combined signal SC2 exceed the predefined higher threshold SS2 in the part of the welding seam corresponding to a distance greater than 270 mm. It is deduced therefrom that the welding seam is incomplete in this zone.

In the case of FIG. 4C, the combined signal SC3 is less than the predefined lower threshold SI3 between 301 mm and 340 mm and greater than the predefined higher threshold SS3 of 340 mm to 392 mm. It is deduced therefrom that the welding seam has a hollow part in the first zone and a non-welded part in the second zone.

In a general fashion, the mathematical operator used according to the invention is a simple operator comprised of addition, subtraction, multiplication, division or any combination of these different operations. The number of sensors used can also be any number, greater than or equal to two.

What is claimed is:

1. A method for detecting and identification of defects at the time of realizing a welding seam (6) by means of a laser beam (14) forming a plasma in a welding region, according to which at least two measurement signals are acquired in real time, said signals being supplied by distinct optical sensors (C1 to C6) that detect the variations in luminous intensity of the plasma, characterized in that the measurement signals are combined by applying to them at least one mathematical operator suitable for detecting a corresponding defect, in order to obtain at least one combined signal; each combined signal is compared to a predefined threshold and the presence or absence of a defect is diagnosed that corresponds to each mathematical operator according to the result of the comparison.

2. A method according to claim 1 in which the mathematical operator is chosen from the group comprising addition, subtraction, multiplication, division and a combination thereof.

3. A method according to claim 2 applied to welding of a stiffener (12) onto a metal plate (1) using two laser beams (14) arranged on either side of the stiffener, wherein two groups of at least one optical sensor (C1, C2, C3, C4, C5, C6) are used and disposed on either side of the stiffener; said optical sensors of the two groups being identical, the measurement signals supplied by one sensor of each group are added and the presence of an insufficient interpenetration of the welding seams owing to insufficient laser beam power is detected when the result is lower than a predefined first threshold.

4. A method according to claim 2, applied to welding of a stiffener (12) onto a metal plate (10) using two laser beams arranged on either side of the stiffener, wherein two groups of at least two optical sensors (C1, C2, C3; C4, C5, C6) are used and detecting variations in luminous intensity of the plasma in different optical bands; said optical sensors of the two groups being identical, the measurement signals supplied on the one hand by a first pair of identical sensors are added and on the other hand the measurement signals supplied by a second pair of identical sensors are added; the one sum is multiplied by the other sums so obtained and an inadequate interpenetration of the welding seams is detected, which due to a defect other than insufficient laser beam power, when the result is greater than a predefined second threshold.

5. A method according to claim 2, applied to soldering of a stiffener (12) onto a metal plate (10) using two laser beams (14) arranged on either side of the stiffener, the stiffener and the metal plate being positioned in advance relative to each other by welding points, wherein two groups of at lest one optical sensor (C1, C2, C3; C4, C5, C6) are used and disposed on either side of the stiffener, the one of the two groups of optical sensors of being identical, the measurement signals supplied by two identical sensors being divided by each other and the presence of previously positioned welding points being detected as deficient, when the result is greater than the third predefined threshold.

6. A method according to claim 2, applied to welding of a stiffener (12) onto a metal plate (10) using two laser beams (14) placed on either side of the stiffener, wherein two groups of at least two sensors (C1, C2, C3; C4, C5, C6) are used that detect variations in the luminous intensity of the plasma indifferent optical bands, dispose on either side of the stiffener; the optical sensors of the two groups being identical, on the one hand the measurement signals supplied by a first pair of identical sensors and on the other hand the measurement signals supplied by the second pair of identical sensors are added; the one of the sums is divided by the other of the two sums, and an insufficient welding seam width is detected, when the result of the division is less than a fourth predefined threshold.

7. A method according to claim 1, applied to edge-to-edge welding of two metal plates using a single laser beam, wherein at least two optical sensors are used that detect variations in the luminous intensity of the plasma in different optical bands, the one measurement signal is divided by the other measurement signal of the measurement signals supplied by two of the sensors and an insufficient thickness of the welding seam is detected, when the result obtained is less than a first threshold and an absence of welding, when the result is greater than a second threshold, greater than the first.

8. A method according to claim 1, wherein the measurement signals are acquired by means of a group of three sensors (C1, C2, C3; C4, C5, C5), the sensors of each group detecting the variations in luminous emission of the plasma in a principally ultraviolet frequency band, a principally visible frequency band, and a principally infrared frequency band, respectively.

9. A method according to claim 1, wherein optical sensors are used (C1, C2, C3; C4, C5, C6) are used each comprising a fiberoptic (16-1 to 16-6), of whose first end is arranged in proximity to the welding region, an optical filter (18-1 to 18-6) is disposed in the extension of the second end of the fiberoptic and a photodiode (20-1 to 20-6) is disposed facing the second end of the fiberoptic, on the other side of the filter.

10. A method according to claim 9, wherein the first end of the fiberoptic is disposed approximately 10 cm form the welding region.

11. A method according to claim 1, wherein a supplementary measurement signal is obtained by means of another optical sensor (C7), detecting variations in thermal energy of the welding seam in back of the welding region.

12. A method according to claim 11, wherein the other optical sensor (C7) comprises another fiberoptic (16-7), whose first end is disposed behind the welding region and oriented towards the welding seam and a photodiode (20-7) sensible to thermal radiation is arranged in the extension of the second end of the other fiberoptic.

13. A method according to claim 12, wherein the first end of the other fiberoptic (16-7) is disposed at a distance of between approximately 10 cm and 20 cm from the welding region.

14. A method according to claim 12, wherein an optical focusing means (22-7) is arranged at the first end of the other fiberoptic (16-7).

15. A method according to claim 1, wherein the measurement signals are combined and are compared to said predefined thresholds after said signals have been acquired in real-time for the welding seam being considered.

16. A method according to claim 15, wherein the mean, the standardized mean, then the standard deviation of each measurement signal is calculated and a qualitative welding irregularity is diagnosed, when the standard deviation exceeds a predefined value.

17. A method according to claim 16, wherein the mean of each measurement signal is compared to the previous means of said signal recorded for a given number of welding seams inspected previously and a deterioration in the measurement apparatus is diagnosed, when the mean of the signal has shifted by at least about 30% relative to the previous means.

18. A method for detecting and identification of defects at the time of realizing a welding seam (6) by means of a laser beam (14) forming a plasma in a welding region, according to which at least two measurement signals are acquired in real time, said signals being supplied by distinct optical sensors (C1 to C6) that detect the variations in luminous intensity of the plasma, characterized in that the measurement signals are combined by applying to them at least one mathematical operator suitable for detecting a corresponding defect, in order to obtain at least one combined signal; each combined signal is compared to a predefined threshold and the presence or absence of a defect is diagnosed that corresponds to each mathematical operator according to the result of the comparison;

wherein the mathematical operator is chosen from the group comprising addition, subtraction, multiplication, division and a combination thereof;

wherein the method is applied to welding of a stiffener (12) onto a metal plate (1) using two laser beams (14) arranged on either side of the stiffener, wherein two groups of at least one optical sensor (C1, C2, C3, C4, C5, C6) are used and disposed on either side of the stiffener; said optical sensors of the two groups being identical, the measurement signals supplied by one sensor of each group are added and the presence of an insufficient interpenetration of the welding seams owing to insufficient laser beam power is detected when the result is lower than a predefined first threshold.

19. A method for detecting and identification of defects at the time of realizing a welding seam (6) by means of a laser beam (14) forming a plasma in a welding region, according to which at least two measurement signals are acquired in real time, said signals being supplied by distinct optical sensors (C1 to C6) that detect the variations in luminous intensity of the plasma, characterized in that the measurement signals are combined by applying to them at least one mathematical operator suitable for detecting a corresponding defect, in order to obtain at least one combined signal; each combined signal is compared to a predefined threshold and the presence or absence of a defect is diagnosed that corresponds to each mathematical operator according to the result of the comparison;

wherein the mathematical operator is chosen from the group comprising addition, subtraction, multiplication, division and a combination thereof;

wherein the method is applied to welding of a stiffener (12) onto a metal plate (10) using two laser beams arranged on either side of the stiffener, wherein two groups of at least two optical sensors (C1, C2, C3; C4, C5, C6) are used and detecting variations in luminous intensity of the plasma in different optical bands; said optical sensors of the two groups being identical, the measurement signals supplied on the one hand by a first pair of identical sensors are added and on the other hand the measurement signals supplied by a second pair of identical sensors are added; the one sum is multiplied by the other sums so obtained and an inadequate interpenetration of the welding seams is detected, which due to a defect other than insufficient laser beam power, when the result is greater than a predefined second threshold.

20. A method according to claim 18, applied to welding of a stiffener (12) onto a metal plate (10) using two laser beams arranged on either side of the stiffener, wherein two groups of at least two optical sensors (C1, C2, C3; C4, C5, C6) are used and detecting variations in luminous intensity of the plasma in different optical bands; said optical sensors of the two groups being identical, the measurement signals supplied on the one hand by a first pair of identical sensors are added and on the other hand the measurement signals supplied by a second pair of identical sensors are added; the one sum is multiplied by the other sums so obtained and an inadequate interpenetration of the welding seams is detected, which due to a defect other than insufficient laser beam power, when the result is greater than a predefined second threshold.

21. A method according to claim 18, applied to soldering of a stiffener (12) onto a metal plate (10) using two laser beams (14) arranged on either side of the stiffener, the stiffener and the metal plate being positioned in advance relative to each other by welding points, wherein two groups of at lest one optical sensor (C1, C2, C3; C4, C5, C6) are used and disposed on either side of the stiffener, the one of the two groups of optical sensors of being identical, the measurement signals supplied by two identical sensors being divided by each other and the presence of previously positioned welding points being detected as deficient, when the result is greater than the third predefined threshold.

22. A method according to claim 19, applied to soldering of a stiffener (12) onto a metal plate (10) using two laser beams (14) arranged on either side of the stiffener, the stiffener and the metal plate being positioned in advance relative to each other by welding points, wherein two groups of at lest one optical sensor (C1, C2, C3; C4, C5, C6) are used and disposed on either side of the stiffener, the one of the two groups of optical sensors of being identical, the measurement signals supplied by two identical sensors being divided by each other and the presence of previously positioned welding points being detected as deficient, when the result is greater than the third predefined threshold.

23. A method according to claim 18, applied to welding of a stiffener (12) onto a metal plate (10) using two laser beams (14) placed on either side of the stiffener, wherein two groups of at least two sensors (C1, C2, C3; C4, C5, C6) are used that detect variations in the luminous intensity of the plasma in different optical bands, dispose on either side of the stiffener; the optical sensors of the two groups being identical, on the one hand the measurement signals supplied by a first pair of identical sensors and on the other hand the measurement signals supplied by the second pair of identical sensors are added; the one of the sums is divided by the other of the two sums, and an insufficient welding seam width is detected, when the result of the division is less than a fourth predefined threshold.

24. A method according to claim 19, applied to welding of a stiffener (12) onto a metal plate (10) using two laser beams (14) placed on either side of the stiffener, wherein two groups of at least two sensors (C1, C2, C3; C4, C5, C6) are used that detect variations in the luminous intensity of the plasma in different optical bands, dispose on either side of the stiffener; the optical sensors of the two groups being identical, on the one hand the measurement signals supplied by a first pair of identical sensors and on the other hand the measurement signals supplied by the second pair of identical sensors are added; the one of the sums is divided by the other of the two sums, and an insufficient welding seam width is detected, when the result of the division is less than a fourth predefined threshold.

25. A method for detecting and identification of defects at the time of realizing a welding seam (6) by means of a laser beam (14) forming a plasma in a welding region, according to which at least two measurement signals are acquired in real time, said signals being supplied by distinct optical sensors (C1 to C6) that detect the variations in luminous intensity of the plasma, characterized in that the measurement signals are combined by applying to them at least one mathematical operator suitable for detecting a corresponding defect, in order to obtain at least one combined signal; each combined signal is compared to a predefined threshold and the presence or absence of a defect is diagnosed that corresponds to each mathematical operator according to the result of the comparison;

wherein the method is applied to edge-to-edge welding of two metal plates using a single laser beam, wherein at least two optical sensors are used that detect variations in the luminous intensity of the plasma in different optical bands, the one measurement signal is divided by the other measurement signal of the measurement signals supplied by two of the sensors and an insufficient thickness of the welding seam is detected, when the result obtained is less than a first threshold and an absence of welding, when the result is greater than a second threshold, greater than the first.

26. A method according to claim 18, wherein the measurement signals are acquired by means of a group of three sensors (C1, C2, C3; C4, C5, C6), the sensors of each group detecting the variations in luminous emission of the plasma in a principally ultraviolet frequency band, a principally visible frequency band, and a principally infrared frequency band, respectively.

27. A method according to claim 19, wherein the measurement signals are acquired by means of a group of three sensors (C1, C2, C3; C4, C5, C6), the sensors of each group detecting the variations in luminous emission of the plasma in a principally ultraviolet frequency band, a principally visible frequency band, and a principally infrared frequency band, respectively.

28. A method according to claim 25, wherein the measurement signals are acquired by means of a group of three sensors (C1, C2, C3; C4, C5, C6), the sensors of each group detecting the variations in luminous emission of the plasma in a principally ultraviolet frequency band, a principally visible frequency band, and a principally infrared frequency band, respectively.

29. A method according to claim 18, wherein optical sensors are used (C1, C2, C3; C4, C5, C6) are used each comprising a fiberoptic (16-1 to 16-6), of whose first end is arranged in proximity to the welding region, an optical filter (18-1 to 18-6) is disposed in the extension of the second end of the fiberoptic and a photodiode (20-1 to 20-6) is disposed facing the second end of the fiberoptic, on the other side of the filter.

30. A method according to claim 19, wherein optical sensors are used (C1, C2, C3; C4, C5, C6) are used each comprising a fiberoptic (16-1 to 16-6), of whose first end is arranged in proximity to the welding region, an optical filter (18-1 to 18-6) is disposed in the extension of the second end of the fiberoptic and a photodiode (20-1 to 20-6) is disposed facing the second end of the fiberoptic, on the other side of the filter.

31. A method according to claim 25, wherein optical sensors are used (C1, C2, C3; C4, C5, C6) are used each comprising a fiberoptic (16-1 to 16-6), of whose first end is arranged in proximity to the welding region, an optical filter (18-1 to 18-6) is disposed in the extension of the second end of the fiberoptic and a photodiode (20-1 to 20-6) is disposed facing the second end of the fiberoptic, on the other side of the filter.

32. A method according to claim 29, wherein the first end of the fiberoptic is disposed approximately 10 cm form the welding region.

33. A method according to claim 30, wherein the first end of the fiberoptic is disposed approximately 10 cm form the welding region.

34. A method according to claim 31, wherein the first end of the fiberoptic is disposed approximately 10 cm form the welding region.

35. A method according to claim 18, wherein a supplementary measurement signal is obtained by means of another optical sensor (C7), detecting variations in thermal energy of the welding seam in back of the welding region.

36. A method according to claim 19, wherein a supplementary measurement signal is obtained by means of another optical sensor (C7), detecting variations in thermal energy of the welding seam in back of the welding region.

37. A method according to claim 25, wherein a supplementary measurement signal is obtained by means of another optical sensor (C7), detecting variations in thermal energy of the welding seam in back of the welding region.

38. A method according to claim 35, wherein the other optical sensor (C7) comprises another fiberoptic (16-7), whose first end is disposed behind the welding region and oriented towards the welding seam and a photodiode (20-7) sensible to thermal radiation is arranged in the extension of the second end of the other fiberoptic.

39. A method according to claim 36, wherein the other optical sensor (C7) comprises another fiberoptic (16-7), whose first end is disposed behind the welding region and oriented towards the welding seam and a photodiode (20-7) sensible to thermal radiation is arranged in the extension of the second end of the other fiberoptic.

40. A method according to claim 37, wherein the other optical sensor (C7) comprises another fiberoptic (16-7), whose first end is disposed behind the welding region and oriented towards the welding seam and a photodiode (20-7) sensible to thermal radiation is arranged in the extension of the second end of the other fiberoptic.

41. A method according to claim 38, wherein the first end of the other fiberoptic (16-7) is disposed at a distance of between approximately 10 cm and 20 cm from the welding region.

42. A method according to claim 39, wherein the first end of the other fiberoptic (16-7) is disposed at a distance of between approximately 10 cm and 20 cm from the welding region.

43. A method according to claim 40, wherein the first end of the other fiberoptic (16-7) is disposed at a distance of between approximately 10 cm and 20 cm from the welding region.

44. A method according to claim 38, wherein an optical focusing means (22-7) is arranged at the first end of the other fiberoptic (16-7).

45. A method according to claim 39, wherein an optical focusing means (22-7) is arranged at the first end of the other fiberoptic (16-7).

46. A method according to claim 40, wherein an optical focusing means (22-7) is arranged at the first end of the other fiberoptic (16-7).

47. A method according to claim 18, wherein the measurement signals are combined and are compared to said predefined thresholds after said signals have been acquired in real-time for the welding seam being considered.

48. A method according to claim 19, wherein the measurement signals are combined and are compared to said predefined thresholds after said signals have been acquired in real-time for the welding seam being considered.

49. A method according to claim 25, wherein the measurement signals are combined and are compared to said predefined thresholds after said signals have been acquired in real-time for the welding seam being considered.

50. A method according to claim 41, wherein the mean, the standardized mean, then the standard deviation of each measurement signal is calculated and a qualitative welding irregularity is diagnosed, when the standard deviation exceeds a predefined value.

51. A method according to claim 42, wherein the mean, the standardized mean, then the standard deviation of each measurement signal is calculated and a qualitative welding irregularity is diagnosed, when the standard deviation exceeds a predefined value.

52. A method according to claim 43, wherein the mean, the standardized mean, then the standard deviation of each measurement signal is calculated and a qualitative welding irregularity is diagnosed, when the standard deviation exceeds a predefined value.

53. A method according to claim 44, wherein the mean of each measurement signal is compared to the previous means of said signal recorded for a given number of welding seams inspected previously and a deterioration in the measurement apparatus is diagnosed, when the mean of the signal has shifted by at least about 30% relative to the previous means.

54. A method according to claim 45, wherein the mean of each measurement signal is compared to the previous means of said signal recorded for a given number of welding seams inspected previously and a deterioration in the measurement apparatus is diagnosed, when the mean of the signal has shifted by at least about 30% relative to the previous means.

55. A method according to claim 46, wherein the mean of each measurement signal is compared to the previous means of said signal recorded for a given number of welding seams inspected previously and a deterioration in the measurement apparatus is diagnosed, when the mean of the signal has shifted by at least about 30% relative to the previous means.

* * * * *

UNITED STATES PATENT AND TRADEMARK OFFICE
CERTIFICATE OF CORRECTION

PATENT NO. : 6,937,329 B2
DATED : August 30, 2005
INVENTOR(S) : Esmiller

It is certified that error appears in the above-identified patent and that said Letters Patent is hereby corrected as shown below:

<u>Drawings,</u>
Fig. 3, Box E2, line 2, delete "STANDARDIZATIOON" and insert
-- STANDARDIZATION -- (as shown on attached drawing sheet).

<u>Column 6,</u>
Line 7, delete "183" and insert -- 18-3 --.

<u>Column 7,</u>
Line 39, delete "don" and insert -- done --.
Line 63, delete "t the" and insert -- to the --.

<u>Column 10,</u>
Line 44, delete "lest" and insert -- least --.

<u>Column 13,</u>
Lines 6 and 17, delete "lest" and insert -- least --.

<u>Column 14,</u>
Lines 56, 59 and 62, delete "form" and insert -- from --.

Signed and Sealed this

Eleventh Day of April, 2006

JON W. DUDAS
*Director of the United States Patent and Trademark Office*